United States Patent [19]
Hurwitz et al.

[11] 4,029,395
[45] June 14, 1977

[54] METHOD FOR ALTERING THE FOCAL ZONE OF A LENS SYSTEM

[75] Inventors: Michael J. Hurwitz, Wilkinsburg; James W. Wonn, Hempfield Township, Westmoreland County, both of Pa.

[73] Assignee: Westinghouse Electric Corporation, Pittsburgh, Pa.

[22] Filed: Oct. 31, 1975

[21] Appl. No.: 627,734

[52] U.S. Cl. .......................... 350/178; 350/175 R; 350/190; 350/213
[51] Int. Cl.² ............................................. G02B 3/06
[58] Field of Search .......... 350/178, 213, 194, 175, 350/130, 139, 193; 181/176; 29/412, 416, 428

[56] References Cited
UNITED STATES PATENTS

| | | | |
|---|---|---|---|
| 749,046 | 1/1904 | Folmer et al. | 350/139 |
| 1,729,106 | 9/1929 | Hallwood | 350/213 X |
| 2,979,997 | 9/1955 | Bertsch | 350/193 X |

FOREIGN PATENTS OR APPLICATIONS

| | | | |
|---|---|---|---|
| 220,961 | 1/1925 | United Kingdom | 350/193 |

*Primary Examiner*—Paul A. Sacher
*Attorney, Agent, or Firm*—F. J. Baehr, Jr.

[57] ABSTRACT

A method for altering the lateral dimension of the focal zone produced by an integral ultrasonic lens system. The method comprises the steps of removing a volume of lens material from the integral lens system so as to define two separate and distinct remainder volumes on each side of the removed volume. The remainder volumes are then laterally or rotationally displaced relative each other to alter the lateral dimension of the focal zone produced by the integral lens or to produce a discrete focal zone for each of the remaining lens volumes.

4 Claims, 13 Drawing Figures

METHOD FOR ALTERING THE FOCAL ZONE OF A LENS SYSTEM

BACKGROUND OF THE INVENTION

1. Field of the Invention

This invention relates to a method for altering the width of the focal zone generated by an integral lens system.

2. Description of the Prior Art

An integral lens system acts to concentrate energy at a predetermined location known to those skilled in the art as the focal zone. The concentration of such energy in a compact focal zone is useful both in the optical and ultrasonic art. It is especially useful in the field of ultrasonic inspection of power generating equipment, such as turbines and generators.

In the prior art, it is at times advantageous to alter the focal zone, and especially the lateral dimension thereof, in order to provide a more widely dispersed laterally extending concentration of sonic energy. Prior art methods for altering the focal zone produced by lens systems require intricate remachining of the lensing surfaces of the integral lens member so that the refinished lens system produces a focal zone different from the previous focal zone in terms of lateral dispersion. However, such refinishing and remachining is an extremely difficult and complex process. Also, the cost of machinery sufficient to adequately provide the refinishing process, especially in the area when refinished surface on adjacent portions of the lens surface must be melded together so as not to create an optical or sonic discontinuity in the lensing surface. As a result, such refinishing and remachining processes are necessarily costly.

SUMMARY OF THE INVENTION

This invention relates to a method for altering the lateral dimension of the focal zone produced by an integral lens system. The lens system has a first and a second lensing surface thereon and defines a predetermined volume of lens material therein. The method comprises, in general, the step of removing the volume of lens material from within the integral volume of the lens system so as to define first and second discrete and separate remainder volumes contiguous to the removed volume, and, translating the remainder so as to alter the distance extant therebetween. The lens material is removed by cutting the integral lens along at least two cutting planes so as to define a first, a second, and an intermediate third volume of lens material. Each cutting plane contains at least two points on both the first and the second lensing surface, the cutting planes disposed so as not to intercept one with the other within the integral lens member. The intermediate third volume of the lens material is removed and remaining first and second volumes are laterally disposed relative to the other, either by moving both of the remaining volumes or moving one volume while the other remains at rest. A volume of isolating medium may be inserted between the remainder volumes in place of the removed volume either before or after the remainder volume are disposed relative to each other. The remainder volumes may be rotated relative to each other or to a common reference datum in order to alter the focal zone. This rotation may be in addition to, or independent of, any lateral displacement of the remainder volumes. Also herein described is a method for producing discrete focal zones from a single focal zone produced by an integral lens system.

It is an object of this invention to provide a method for efficiently and inexpensively altering the lateral dimension of a focal zone produced by an integral lens system. It is a further object of this invention to provide a method for producing two discrete focal zones from one focal zone produced by an integral lens member. Other objects of this invention will become clear from the following detailed description of the preferred embodiment which is described herein.

BRIEF DESCRIPTION OF THE DRAWINGS

The invention will be more fully understood from the following detailed description of a preferred embodiment taken in connection with the accompanying drawings in which.

DESCRIPTION OF THE PREFERRED EMBODIMENT

Figure 1:
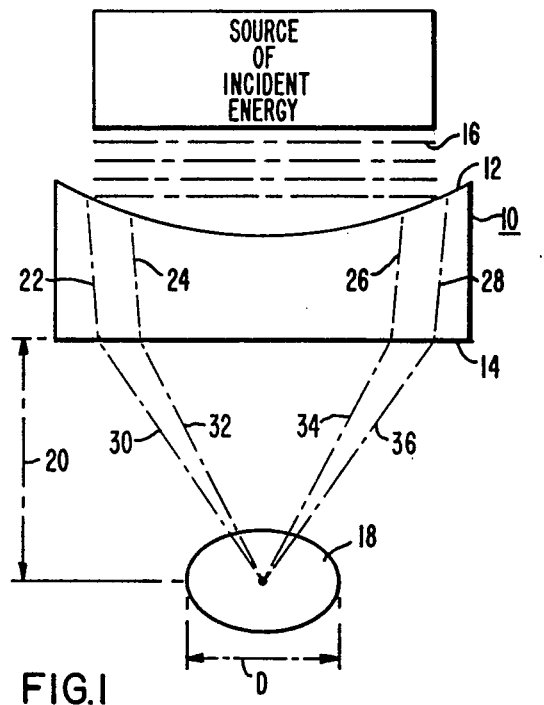
FIG. 1 is a schematic representation of the relevant principals of operation of an integral lens system.

Throughout the following description, similar reference numerals refer to similar elements in all figures of the drawings.

Referring first to FIG. 1, a schematic view of a lens member generally indicated by reference number 10, and having a first lensing surface 12 and a second lensing surface 14 disposed thereon. It is to be understood that the lens member 10 may be a lens system providing a plurality of discrete yet integrally connected lens elements and remain in the contemplation of this invention. Similarly, although the first lensing surface 12 is shown to be cylindrical in shape while the second lensing surface 14 is planer, it is understood that any lens system having a first and second lensing surface thereon is within the contemplation of this invention.

As is well known, the lens member 10 acts to concentrate energy in the form of waves 16 incident on the first surface 12 thereof to a predetermined concentrated focal zone 18 located a predetermined distance 20 away from the second lensing surface 14. The focal zone 18 has associated therewith a predetermined lateral dimension D as seen in FIG. 1. The incident energy 16 may be either in the form of light or sound waves and it is to be understood that although the following description describes the incident energy waves 16 as sound, it is within the contemplation of this invention that the lens member 10 may be used to concentrate light waves or other electromagnetic waves and wiil act in a manner as described herein.

As is well known in the art, the lens system 10 concentrates the incident energy within the focal zone 18 by providing within the volume of the lens 10 a plurality of discrete ray paths, as those illustrated by reference numerals 22, 24, 26, and 28. Each ray path 22 through 28 may be envisioned as concentrating that portion of the incoming energy 16 incident of the first lensing surface of each ray path within predetermined portions of the focal zone 18, as shown by rays 30, 32, 34 and 36. It is the summation of the effects of all the discrete ray paths within the lens material 10 which produces the focal zone 18.

It is well known in the art that if certain of the ray paths within the lens system 10 are removed from operation, such as by positioning of an opaque material over the corresponding portion of the first lensing surface of the particular ray path, the other ray paths would not be affected and the focusing effect produced thereby on the portions of incident energy impinging thereon is similarly unaffected.

Thus, for example in FIG. 1, if ray paths 26 and 28 were, for example, removed from operation by the placing of an opaque shield thereover to prevent the incidence of incoming energy upon the first lensing surfaces thereof, the refracted beams 34 and 36 shown as exiting from the second lensing surfaces 14 of the ray paths 26 and 28 would be prevented. However, shielding ray paths 26 and 28 would not affect ray paths 22 and 24 nor the refracted beams 30 and 32 produced thereby.

It is desirable at times to alter the lateral dimension D of the focal zone 18 produced by a lens system 10. Such operation is especially desirable in the area of ultrasonic inspection of members. There it becomes important to provide a more widely dispersed, yet still concentrated, focal zone of energy produced by a particular lens system. When such alterations are required in the prior art, the known expedient is to remachine the lens system involved so as to redefine either the first or the second lensing surfaces, or both, so as to alter the focal zone produced thereby. However, such resurfacing and remachining is difficult, time consuming, intricate, and therefore, expensive. This invention provides a simple, efficient, and inexpensive method of altering the lateral dimensions D of a focal zone 18 produced by a lens system 10 having a first lensing surface 12 and a second lensing surface 14 disposed theron. Also described herein is a method of producing discrete focal zones from a previously integral focal zone.

Figure 2A:
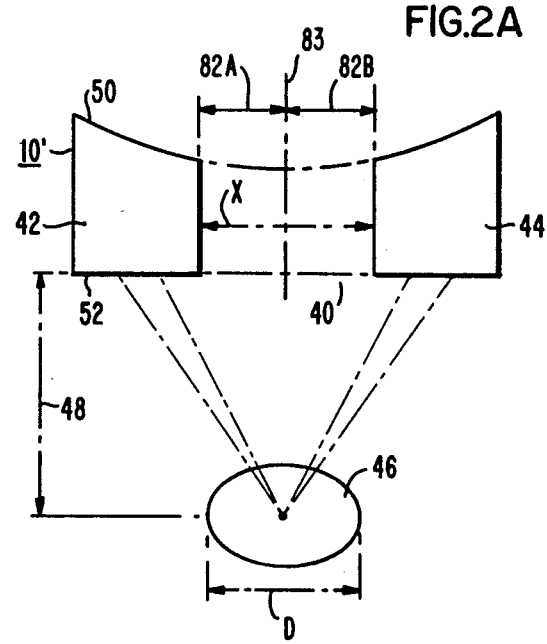
FIG. 2A and 2B are schematic representations of the principle of operation on which the invention is premised.

Referring to FIG. 2, a schematic representation illustrates the principle of operation on which applicants' inventive method is premised. In FIG. 2A, there is seen a lens member 10' from which portion 40 is removed so as to define remainder portions 42 and 44 on each side thereof. The segments 42 and 44 are disposed from each other a predetermined distance X once the volume 40 has been removed therefrom. For the same reasoning as described in conjunction with the shielding of a portion of the lens surface, such an arrangement as in FIG. 2A (with a portion 40 removed) does not affect the lensing functions of the remaining portions 42 and 44. Therefore, a focal zone 46 of a predetermined dimension D occurring at a predetermined distance 48 from the second lensing surfaces 52 is produced.

Figure 2B:
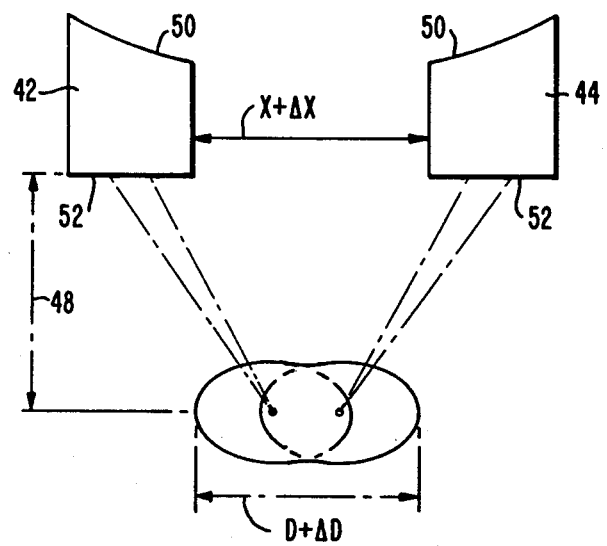

As may be appreciated and as illustrated in FIG. 2B, if the segments are laterally moved one relative to the other, so as to increase the gap to a distance $(X + \Delta X)$, the effect is the increase of the lateral dimension from D to $(D + \Delta D)$, where $\Delta D$ is equal to $\Delta X$. Note that the laterally expanded focal zone remains the distance 48 from the surfaces 52. Also, note that the magnitude of the increases of the focal zone, $\Delta D$, equals the magnitude of the increased lateral gap, $\Delta D$. Also, as will be seen herein, if the gap were decreased by $\Delta X$, the lateral dimension of the focal zone would still increase by $\Delta D$. The movement of the lens volumes 42 and 44 may be effected in a number of ways, such as by the displacement of the segment 44 with respect to segment 42, or by displacement of segment 42 with respect to segment 44, or by displacement of both segments 42 and 44 with respect to each other, so long as the result is an increase in the gap distance from X to $(X + \Delta X)$. It is seen that incident energy upon the first lensing surface 50 of each of the portions 42 and 44 of the lens is cncentrated in a focal zone having a wider lateral dimension $(D + \Delta D)$ than the dimension D of the focal zone produced by the integral lens 10'. It is this principal of operation of which applicants' method described herein is premised.

Figure 4:
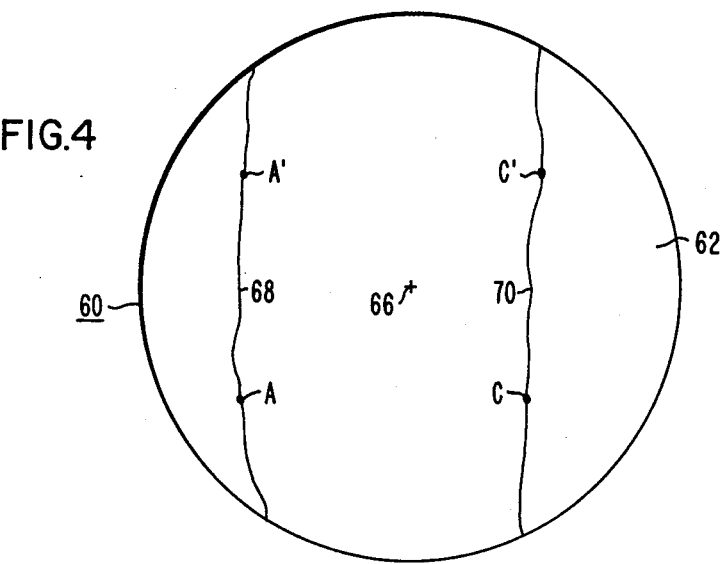
Figure 3:
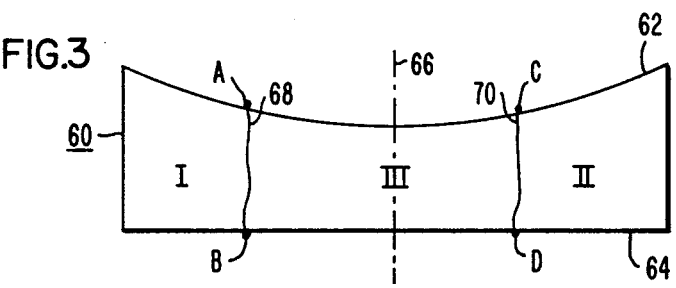
Figure 5:
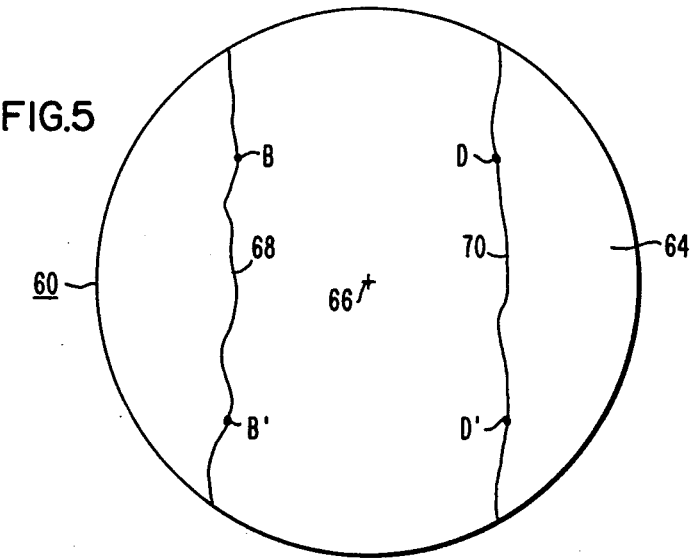

Referring now to FIGS. 3, 4 and 5, FIG. 3 is an elevational view of an integral lens member 60 on which the steps of applicants' method will be described so as to enable one skilled in the art to practice the same. FIGS. 4 and 5 are, respectively, top and bottom views of the lens member 60 shown in elevation in FIG. 3. As an integral lens member 60, a predetermined focal zone having a predetermined lateral dimension is produced when ultrasonic energy is introduced thereupon. The lens system 60 comprises a first and second lensing surface 62 and 64, each of any predetermined configuration. A geometric axis 66 extends through the geometric center of the lens member 60 and is perpendicular to both the first lensing surface 62 and the second lensing surface 64. The geometric axis 66 does not necessarily lie coincident with the acoustic axis of the lens.

Applicants' method comprises the step of removing a volume of lens material that is less than the total volume of lens material of lens system 60 so as to define remaining zones of lens material adjacent to the removed volume, yet which are separate and discrete from each other. This may be accomplished by the step of cutting the integral lens system 60 along a first and a second cutting plane, illustrated in the Figures by reference numerals 68 and 70 respectively. Cutting of the lens member 60 by passing cutting surfaces 68 and 70 therethrough defines three volumes of lens material denominated in FIG. 3 by I, II and III respectively. As seen in FIG. 3, first and second volumes I and II of material produced by the cutting plane 68 and 70 lie on each side of the intermediate volume of lens material III.

The cutting planes 68 and 70 are defined in FIGS. 3, 4 and 5 so that each cutting plane 68 and 70 contains at least two points on the first lens surface 62 and two points on the second lens surface 64. Thus, as shown in the Figures, points A and A' are disposed at any locations on the first lensing surface 62 while points B and B' are disposed at any particular location on the second lensing surface 64. The first cutting plane 68 is described so that it crosses through both of the first and the second lensing surfaces 62 and 64 so that both points A and A' on the first lensing surface 62 and the points B and B' on the second lensing surface 64 are contained within the first cutting planes 68. Similarly, for cutting plane 70, the points C and C' defined on the first lensing surface 62 and the points D and D' described on the second lensing surface 64 are contained within the second cutting plane 70.

A further restriction on the cutting planes 68 and 70 is that they do not intersect within the volume of the lens material, although they may so intersect elsewhere. Stating this restriction alternatively, a third plane exists between the first and the second cutting planes 68 and 70 which does not contain any of the points A, A', B, B', C, C', D, D'. Yet, alternatively, the first cutting plane 68, the second cutting plane 70, the first lensing surface 62 between the cutting plane 68 and 70 and the portion of the second lensing surface 64 disposed between the cutting planes 68 and 70 define a closed volume, III, that is separate and distinct from volumes I and II.

It is also to be noted that applicants' invention include any steps which simultaneously cut along cutting planes 68 and 70 and simultaneously remove the volume III defined therein therebetween, as by splintering. Thus, the process of altering a lens by the use of a milling cutter which simultaneously cuts and removes lens material is specifically noted as being within the teachings of this invention.

Figure 6:
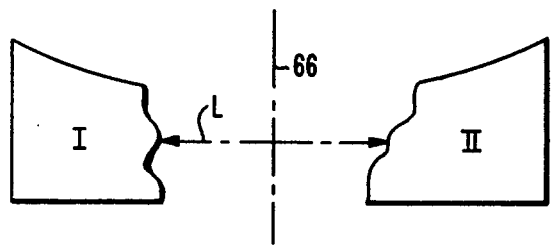
FIGS. 3, 4, 5, 6, 7A and 7B are schematic representations of the zones and surfaces utilizes in the method embodying the teachings of this invention.

Referring now to FIG. 6, after the integral lens member is cut into the first volume I, the second volume II and the intermediate thrid volume III by the cutting planes 68 and 70, the third intermediate volume III is removed such that the first and second remainder volumes I and II are separate and discrete from each other laterally disposed from each other a distance L. The final step in applicants' method for altering the lateral dimension of focal zone produced by an integral lens system is to translate remainder volumes I and II so as to alter the distance L extant therebetween. Applicants' invention teaches the lateral displacement of either volume I away from volume II or volume II away from volume I so as to alter, that is either increase or decrease, the distance L lying therebetween. In addition, simultaneously laterally displacing both volumes I and II relative to each so as to either increase or decrease the distance L is within the teachings of this invention.

Figure 7A:
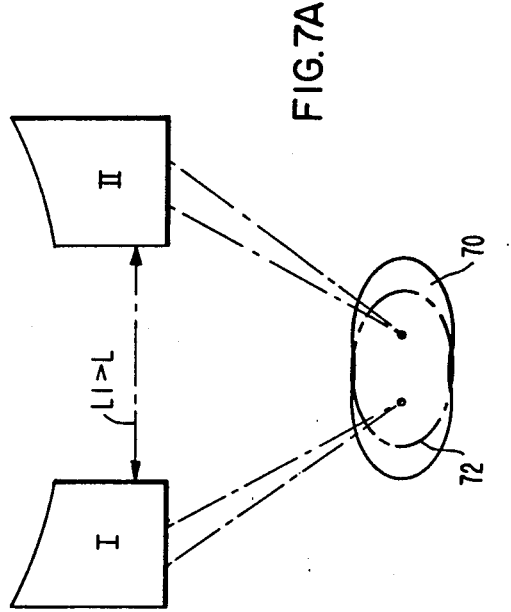
Figure 7B:
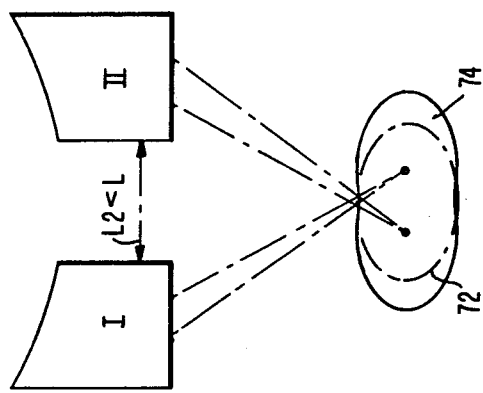

It may be seen, similar to the description accompanying reference FIG. 2B, displacement of remainder volumes I or II in accordance with the above teachings alters the lateral dimension of the focal zone produced by the remainder volumes I and II of lens material when energy is permitted to impinge thereupon. Thus, as seen in FIG. 7A, if the remainder volumes I and II are moved so that the distance L1 between them exceeds the distance L in FIG. 6, the focal zone 70 produced when energy is permitted to impinge upon the remainder volumes of lens material is laterally dispersed to a greater dimension. The increased lateral dimension and shaping is shown in FIG. 7A by the superimposition of focal zone 70 produced by the method of applicants over the focal zone 72 produced by the original lens system 60. Similarly, as shown in FIG. 7B, when the remainder volumes I and II are displaced one with the other so that the distance L2 extant therebetween is less than the distance L, the focal zone 74 produced thereby (and indicated by superimposition over the original focal zone 72) has a greater lateral dimension than the original focal zone 72 produced by the integral lens system 60.

It is thus appreciated that moving the remainder volumes I and II laterally relative to each other so as to either increase or decrease the distance therebetween once the intermediate third volume III has been removed results in the increase of the lateral dimension of the focal zones produced thereby. That is, the resultant focal zone is increased if the remainder volumes are moved either toward or away from each other, the magnitude of the increase being directly related to the magnitude of the displacement of the remainder volumes I and II.

Figure 8A:
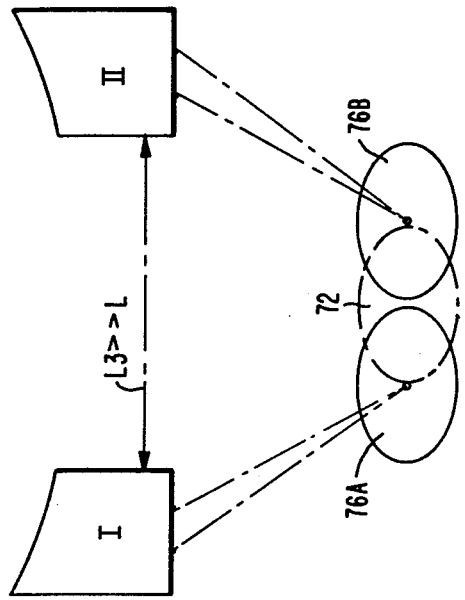
FIGS. 8A and 8B show an alternate embodiment of the invention.
Figure 8B:
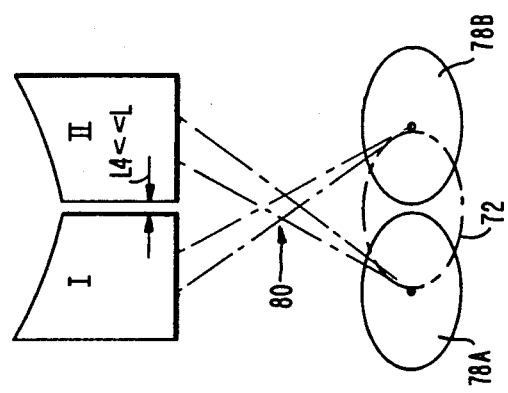

Of course, it is also to be appreciated from reference to FIG. 8A that if the remainder volumes I and II are displaced relative each other so that a dimension L3, much, much greater than the dimension L lies between the remainder volumes I and II, incidence of energy upon the surfaces of the remainder volume I and II results in the production of discrete focal zones 76A and 76B as opposed to one integral focal zone 72 originally produced by an integral lens member 60. similarly, as shown in FIG. 8B, if the remainder volumes I and II are displaced relative to each other so that a distance L4, much, much less than the original distance L exists therebetween, discrete focal zones 78A and 78B are produced as opposed to the integral focal zone 72 produced originally by the lens system 60.

It is to be noticed in FIG. 8A that focal zone 76A is produced by lens remainder volume I while focal zone 76B is produced by lens remainder volume II, and that the energy refracted by the lens remainder volume I and that refracted by the lens remainder volume II do not intersect. However, as seen in FIG. 8B, focal zone 78 is produced by lens remainder volume I and focal 76B is produced by lens remainder volume II, and the energy refracted by the respective lens remainder volumes I and II do intersect, as illustrated by numeral 80.

Figure 9:
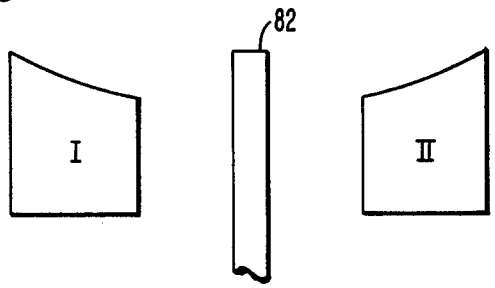
FIG. 9 shows an alternate embodiment of the invention.

Referring now to FIG. 9, there is shown yet another embodiment of the invention. As there seen, once the intermediate volume III has been removed and the remainder volumes I and II are disposed either distance L1, L2, L3 or L4 from the other, it is within the teachings of this invention to insert between the lens remainder volumes I and II a suitable barrier of isolating medium, such as a mixture of ground cork and neoprene rubber, a tungsten epoxy, or two fluid-tight members with a gas or vacuum therebetween, as illustrated by reference numeral 82. Such a barrier of isolating medium prevents what is known in the ultrasonic art as "cross-talk". Of course, it is understood that the isolating barrier 81 may be disposed within the volume occupied by the volume occupied by the removed volume III either before or after the displacement of the lens remainder volumes I and II relative to the other.

In connection with FIG. 7B, it is, of course, understood that the remainder volumes I and II may be moved relative to the other until they abut one with the other. Also, although FIGS. 3, 4, 5 and 6 illustrate irregularly shaped cutting planes 68 and 70, it is certainly within the contemplation of this invention to dispose first and second cutting planes 68 and 70 which are planar surface and which are parallel to each other. Also, while parallel to each other, the cutting surface (planar or non-planar) may, if desired, be disposed parallel to a geometric axis (such as axis 66) extending through the geometric center of the integral lens system 60 and being perpendicular to both the first and the second lensing surfaces. Of course, the intermediate third volume III may include a plane containing the geometric axis and have the cutting planes disposed parallel both to each other and to the geometric axis. Further, the intermediate third volume III may contain an equal volume of lens material on both sides of the plane containing the geometric axis. Such a situation and a particular embodiment of the invention method embodying these limitations would be that illustrated in FIG. 2A. There, the integral lens member 10' has a geometric axis, clearly indicated by reference numeral 66, and the intermediate third volume, indicated by reference numeral 40, has equal portions 82A and 82B of lens material diposed on both sides of the plane containing the geometric axis 66.

In addition to laterally displacing the remainder volumes I and II defined after removal of volume III (see FIG. 6), it is within the contemplation of this invention to increase the width of the focal zone by displacing the remainder volumes angularly relative to a predetermined reference datum. That is, either or both of the remainder volumes I and II may be tipped angularly in order to alter the focal zone produced by the integral lens system. Of course, in view of the foregoing description, it is within the contemplation of this invention to both laterally and angularly displace the remainder volumes to achieve this desired result.

Figure 10:
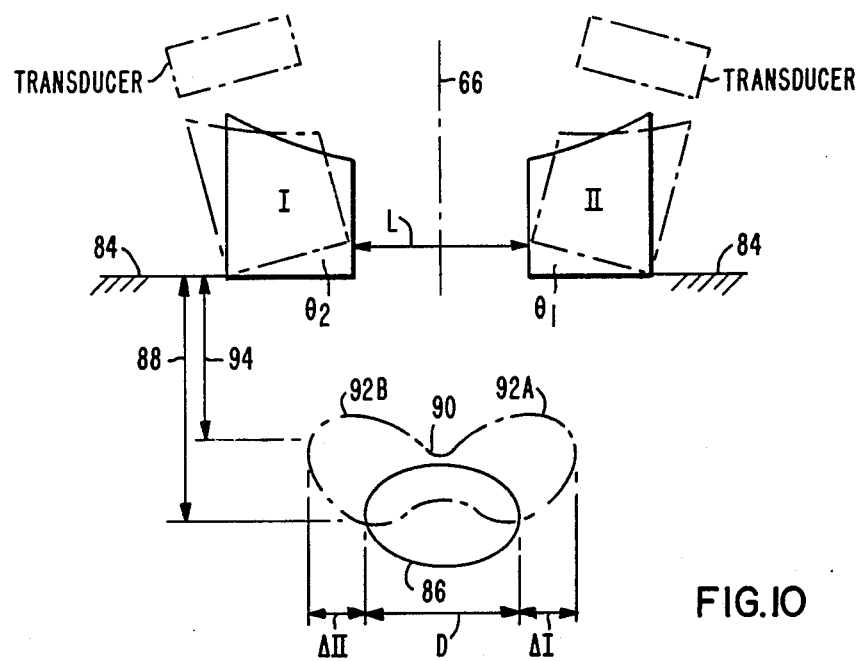
FIG. 10 is a diagrammatic view illustrating another embodiment of the invention.

With reference to FIG. 10, there is diagrammatically shown the remainder volumes I and II disposed a lateral distance L from each other on a datum plane 84. The integral lens system from which the remainder volumes I and II were generated (upon removal of volume III) defined a focal zone indicated in solid lines by numeral 86, that focal zone occurring at a distance 88 beneath the datum 84. The focal zone 86 has a lateral dimension D, while the integral lens system had a geometric axis 66 associated therewith.

According to applicants' invention, angular displacement of either or both of the remainder volumes I and II results in an alteration of the lateral dimension of the focal zone. That is, tipping of either remainder volume (or both remainder volumes) for a predetermined angular displacement $\theta$, measured relative to the datum 84, results in an altered focal zone 90 shown to have lobes 92A and 92B and with an increased lateral dimension. It is noted that $\theta$ may be referenced to and measured from any predetermined datum, such as axis 66.

The lobe 92B and the resultant lateral focal zone dimension increase $\Delta II$ is produced by the tipping of the remainder volume II the predetermined angle $\theta_1$. Similarly, the lobe 92A and the resultant lateral dimension increase $\Delta I$ is caused by the tipping of the remainder volume I the predetermined angle $\theta_2$, both $\theta_1$ and $\theta_2$ being measured with respect to datum 84. The angles $\theta_1$ and $\theta_2$ need not be equal. It is noted that the angular displacements may occur with any point on the surface of either remainder volume maintaining contact with the datum and acting as the pivot point for the remainder volume. Thus, either remainder volume may be tipped a predetermined angle by rotation clockwise or counterclockwise in the plane of the paper, or in directions into or out of the plane of the paper, or in any other direction. Also, it is noted that the resultant focal zone 92 may be disposed a greater or lesser distance beneath the datum 84, depending, of course, upon the rotation direction and the magnitude of the angular displacement. In FIG. 10, the zone 92 occurs at a lesser dimension 94 from the datum 84.

Having described applicants' inventive method on a generalized lens member 60 as depicted and described above, it is, of course, apparent that the lens member 60 may be any commonly configured lens arrangement. That is, applicants' invention is especially applicable to both a spherical and a cylindrical lens.

We claim:

1. A method for altering the lateral dimension of a focal zone produced by an integral lens system having a first and a second lensing surface thereon, said method comprising the steps of:

removing a volume of lens material from said integral lens system so as to define first and second discrete remaining volumes, each of said remaining volumes having a point disposed therein, said points defining a straight line;

displacing one of said remaining volumes with respect to the other in such a manner that said points remain on said line, and that said remaining volumes are spaced apart; and directing energy on one surface of each of said remaining volumes, whereby the energy is focused in a zone having an enlarged lateral dimension relative to the focal zone of the integral lens system.

2. The method set forth in claim 1 and further comprising the step of inserting a medium generally impervious to said energy intermediate said first and second remaining volumes to reduce cross-talk therebetween.

3. The method set forth in claim 1, wherein one of the remaining volumes is disposed on an angle greater than 0° with respect to the line through the points within the first and second volume.

4. The method set forth in claim 1, wherein each of the remaining volumes are disposed at an angle greater than 0° with respect to the line through the points within the remaining volumes.

* * * * *